United States Patent
Yoshiike et al.

(10) Patent No.: US 12,115,686 B2
(45) Date of Patent: Oct. 15, 2024

(54) OPERATION SYSTEM AND OPERATION METHOD

(71) Applicants: HONDA MOTOR CO., LTD., Tokyo (JP); University of Massachusetts, Boston, MA (US)

(72) Inventors: Takahide Yoshiike, Wako (JP); Christopher Garry, Wako (JP); Frank Charles Sup, IV, Amherst, MA (US); Soumitra P. Sitole, Amherst, MA (US); Mark A. Price, Amherst, MA (US)

(73) Assignees: HONDA MOTOR CO., LTD., Tokyo (JP); UNIVERSITY OF MASSACHUSETTS, Boston, MA (US)

( * ) Notice: Subject to any disclaimer, the term of this patent is extended or adjusted under 35 U.S.C. 154(b) by 294 days.

(21) Appl. No.: 17/830,831

(22) Filed: Jun. 2, 2022

(65) Prior Publication Data
US 2022/0388176 A1 Dec. 8, 2022

(30) Foreign Application Priority Data
Jun. 8, 2021 (JP) .................. 2021-096183

(51) Int. Cl.
*B25J 9/16* (2006.01)
*G06F 3/01* (2006.01)
(Continued)

(52) U.S. Cl.
CPC ........... *B25J 9/1697* (2013.01); *B25J 9/1664* (2013.01); *G06F 3/015* (2013.01); *G06T 7/20* (2013.01);
(Continued)

(58) Field of Classification Search
CPC ...... B25J 9/1697; B25J 9/1664; B25J 9/1689; G06F 3/015; G06F 3/012; G06F 3/013;
(Continued)

(56) References Cited

U.S. PATENT DOCUMENTS 11,328,533 B1 * 5/2022 Tadi ..................... G06N 20/00
2003/0195429 A1 * 10/2003 Wilson .................. A61B 5/372
600/544

(Continued)

FOREIGN PATENT DOCUMENTS

CN 112114665 A * 12/2020 ............ G06F 3/015
CN 113632176 A * 11/2021 ............ G06F 3/011
(Continued)

OTHER PUBLICATIONS

WO2019192172A1-English. Translate; Zhu et al.; Goertek Inc.; Attitude Prediction Method and Apparatus, and Electronic Device (Year: 2019).*
(Continued)

*Primary Examiner* — B M M Hannan
(74) *Attorney, Agent, or Firm* — Rankin, Hill & Clark LLP

(57) ABSTRACT

An operation system and an operation method that may improve operability are provided. The operation system includes a circuitry configured to determine a predicted value of an operator motion after a predetermined prediction latency from a current time based on a bio-signal using a prescribed machine learning model, the bio-signal captured from the operator and a controller configured to control a motion of a robot based on the predicted value. The operation method includes a step of determining a predicted value of an operator motion after a predetermined latency from the current time based on a bio-signal using a prescribed machine learning model, the bio-signal captured from the operator, and a step of controlling a motion of a robot on the predicted value.

7 Claims, 8 Drawing Sheets

(51) Int. Cl.
    *G06T 7/20*     (2017.01)
    *H04N 7/18*     (2006.01)

(52) U.S. Cl.
    CPC .............. *G06F 3/012* (2013.01); *G06F 3/013* (2013.01); *G06F 3/014* (2013.01); *G06T 2207/20081* (2013.01); *H04N 7/183* (2013.01)

(58) Field of Classification Search
    CPC .......... G06F 3/014; G06F 3/011; G06F 3/017; G06T 7/20; G06T 2207/20081; G06T 2207/20084; G06T 2207/30004; G06T 2207/30021; G06T 7/246; H04N 7/183; G05B 2219/40151
    USPC .................................. 700/245, 255, 258, 259
    See application file for complete search history.

(56) References Cited

U.S. PATENT DOCUMENTS

| | | | |
|---|---|---|---|
| 2020/0005770 A1* | 1/2020 | Lunner | H04R 25/407 |
| 2020/0170542 A1* | 6/2020 | Waziri | A61B 5/065 |
| 2020/0333882 A1* | 10/2020 | Mallinson | A61B 5/7246 |
| 2021/0142187 A1* | 5/2021 | Zilberman | G06N 20/20 |
| 2021/0142435 A1* | 5/2021 | Zilberman | G06N 5/04 |
| 2021/0259563 A1* | 8/2021 | Tadi | G01P 13/00 |
| 2022/0192556 A1* | 6/2022 | Sankar | A61B 5/1116 |

FOREIGN PATENT DOCUMENTS

| | | | | |
|---|---|---|---|---|
| JP | 2001-054507 | | 2/2001 | |
| JP | 2001029485 A | * | 2/2001 | |
| JP | 2007534425 A | * | 11/2007 | |
| JP | 4348577 B2 | * | 10/2009 | |
| JP | 2018505759 A | * | 3/2018 | |
| JP | 2020-10765 A | | 1/2020 | |
| KR | 20160100770 A | * | 8/2016 | |
| WO | WO-2018083211 A1 | * | 5/2018 | ......... G02B 27/0093 |
| WO | WO-2019192172 A1 | * | 10/2019 | ............. G06F 3/011 |
| WO | WO-2019193574 A1 | * | 10/2019 | ........... A61B 5/0205 |

OTHER PUBLICATIONS

JPH11192214. English. translate; Hayakawa Takeshi; Sony Corp; Manufacture of Numerical Model With Respect to Vertebrateanimal or Robot Imitating Same (Year: 1999).*
JP4926042B2.English.translate, Einav et al.; (Year: 2007).*
KR20200033839. English.translate; Lee Hoo Man; Exosystems Inc; Rehabilitation System Performing Rehabilitation Program Using wearable Device and User Electronic Device. (Year: 2020).*
A Hybrid FPGA-Based System for EEG- and EMG-Based Online Movement Prediction-17-01552-with-cover; Prof. Dr. Wendong Xiao, Dr. Zhiqiang Zhang and Prof. Le Zhang (Year: 2017).*
Japanese Office Action dated May 14, 2024 issued in corresponding Japanese application No. 2021-096183; English machine translation included (10 pages).

* cited by examiner

OPERATION SYSTEM AND OPERATION METHOD

BACKGROUND OF THE INVENTION

Field of the Invention

The present invention relates to an operation system and an operation method.

Priority is claimed on Japanese Patent Application No. 2021-096183, filed Jun. 8, 2021, the content of which is incorporated herein by reference.

Description of Related Art

An operation system that receives an operator motion and drives a robot according to the received motion has been proposed. Such an operation system may be configured as a tele-operation system that transmits an operator's motion to a robot which is remotely located by communication. In such an operation system, a motion of a robot is later than the operator's motion due to a communication delay, a control delay, etc. The motion of the robot is filmed by a camera or the like and is presented to the operator using a head-mounted display, a stationary monitor screen, or the like. At this time, a delay of an image is generated due to sampling at the time of imaging, a communication delay, etc. The operator views the presented image and determines a next motion. When a delay occurs in the motion recognized by viewing the image, the operator may have to delay the operator's operation. In this case, operation efficiency may be deteriorated and the operational feeling to the operator may be impaired in control of the robot.

On the other hand, a future motion may be predicted by extrapolating information acquired by measuring a human motion using a technique such as a Kalman filtering. For example, Patent Literature 1 discloses a tele-operation communication system in which a relay node disposed on a communication line connecting a master device and a slave device corrects sensor information on the basis of delay information, recent sensor information, and recent operation command information. This prediction of a motion is effective for a constant-speed motion.

Patent Literature

[Patent Literature 1] Japanese Unexamined Patent Application, First Publication No. 2001-054507

SUMMARY OF THE INVENTION

However, even if the technique described in Patent Literature 1 is used, a motion of a robot is later than an operator motion. When a speed of the operator motion changes, a motion of the robot at a time is different from the operator motion at that time. This may cause a deterioration in operation efficiency and a hindrance to the operational feeling to the operator.

An aspect of the invention was made in consideration of the aforementioned circumstances and an objective thereof is to provide an operation system and an operation method that can improve operability.

(1) In order to achieve the aforementioned objective, an aspect of the invention provides an operation system including: a circuitry configured to determine a predicted value of an operator motion after a predetermined prediction latency from a current time based on a bio-signal using a prescribed machine learning model, the bio-signal captured from the operator; and a controller configured to control a motion of a robot based on the predicted value.

(2) Another aspect of the invention provides the operation system according to (1), the circuitry configured to estimate a second motion based on at least an image representing a motion environment of the robot and a motion signal indicating the operator motion, the second motion potentially performed by the operator, wherein the controller is configured to control the motion of the robot additionally based on the second motion.

(3) Another aspect of the invention provides the operation system according to (1), further including a signal detector configured to detect an electromyogram as the bio-signal.

(4) Another aspect of the invention provides the operation system according to (1), further including a signal detector configured to detect an electroencephalogram as the bio-signal.

(5) Another aspect of the invention provides the operation system according to (1), further including a transmission path to transmit the predicted value.

(6) Another aspect of the invention provides the operation system according to (5), further including: a video camera configured to capture an image representing a motion environment of the robot; and a display unit configured to display the image.

(7) Another aspect of the invention provides the operation system according to (1), the circuitry configured to determine parameters for the machine learning model such that a difference between the predicted value determined based on the bio-signal and a measured value of the operator motion at the current time minimizes, the bio-signal delayed by the prediction latency.

(8) Another aspect of the invention provides an operation method which is performed by an operation system, including: a first step of determining a predicted value of an operator motion after a predetermined latency from a current time based on a bio-signal using a prescribed machine learning model; and a second step of controlling a motion of a robot based on the predicted value.

According to the configurations of (1) and (8), a motion of a robot is controlled based on the bio-signal generated prior to the operator motion. A delay, until the operator motion is recognized to be reflected in the motion of the robot is reduced, thereby improving the operability of the robot.

According to the configuration of (2), the motion intended by the operator is estimated as the second motion based on the operator motion and the motion environment of the robot. Since the operation of the robot is supplemented with the second motion, the operator's intention is reflected in the motion of the robot, thereby further improving the operability of the robot.

According to the configuration of (3), the electromyogram generated prior to the motion, can be acquired and used to predict the motion without the operator's awareness.

According to the configuration of (4), the electroencephalogram, generated prior to the motion can be acquired and used to predict the motion without the operator's awareness.

According to the configuration of (5), even in a usage form with the operation device separated from the robot, thereby controlling the motion of the robot.

According to the configuration of (6), the image representing the motion environment of the robot, captured by the imaging unit is displayed on the display unit. Accordingly, even in a usage form with the operator separated from the robot, the operator can visually recognize a situation of the robot.

According to the configuration of (7), it enables to train the machine learning model for estimating the motion based on the operator motion and the bio-signal generated prior to the motion.

DETAILED DESCRIPTION OF THE INVENTION

First Embodiment

Hereinafter, a first embodiment will be described with reference to the accompanying drawings.

Figure 1:
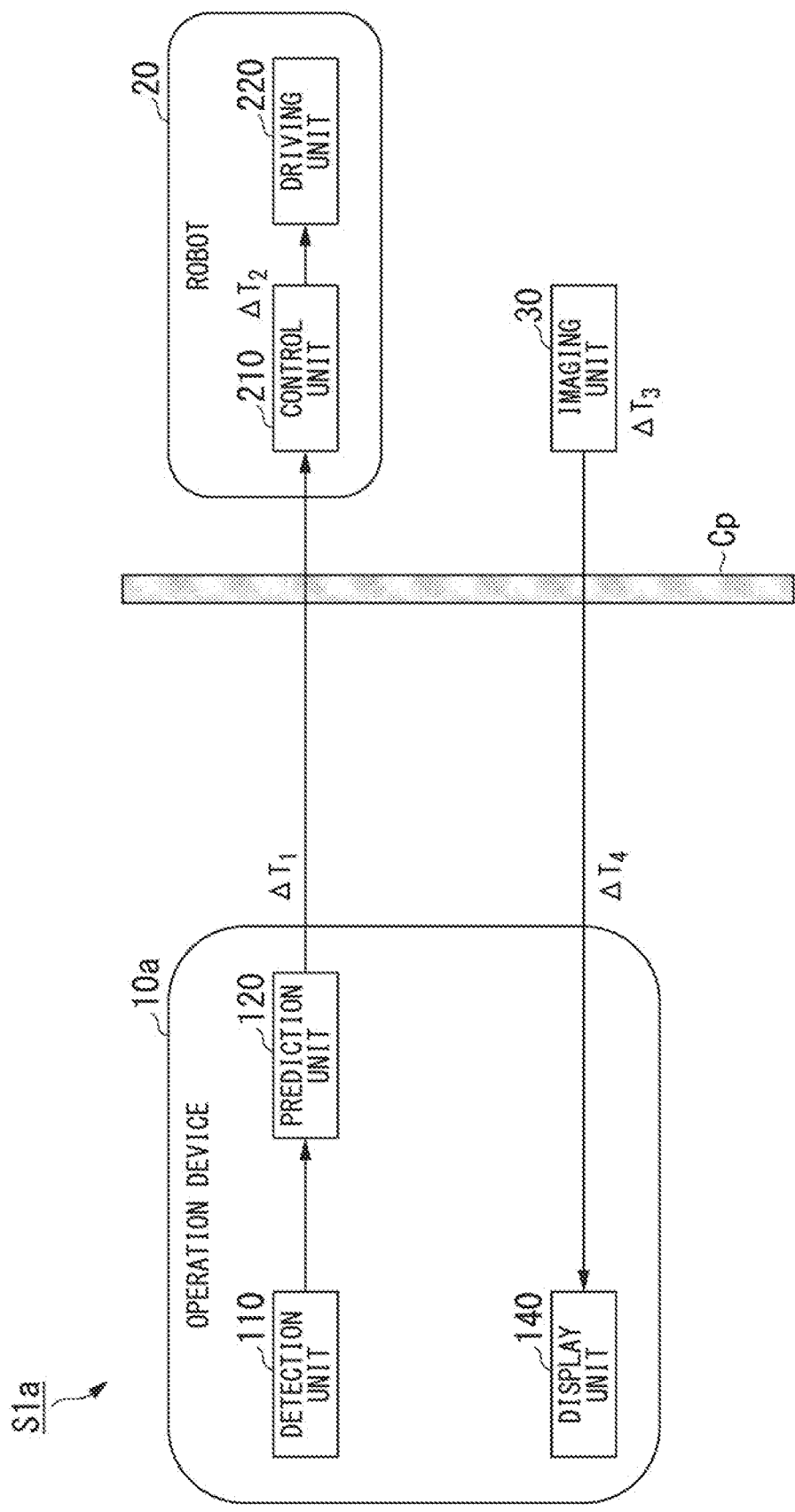
FIG. 1 is a block diagram schematically illustrating an example of a configuration of an operation system according to a first embodiment.

FIG. 1 is a block diagram schematically illustrating an example of a configuration of an operation system S1a according to a first embodiment.

The operation system S1a determines a predicted value of an operator's motion at a prediction time from the operator's bio-signal using a predetermined machine learning model. The prediction time is a time at which a predetermined prediction latency is elapsed from this moment (the current time). The operation system S1a controls a motion of a robot 20 on the basis of the predicted value. The operator can manipulate a position or a shape of the robot 20 according to the operator's motion.

The operation system S1a includes an operation device 10a, a robot 20, and an imaging unit 30. The operation device 10a and the robot 20 are connected to transmit and receive various types of data to and from each other via a transmission path $C_p$ in a wireless or wired manner. The transmission path $C_p$, is not limited to a data bus (a base line) and a part or entire transmission path $C_p$, may comprise a communication network.

The imaging unit 30 captures an image indicating the robot 20 in the field of view thereof and surroundings thereof. A motion environment of the robot 20 is visualized in the image. The imaging unit 30 transmits image data representing the captured image to the operation device 10a via the transmission path $C_p$. The imaging unit 30 is, for example, a digital video camera.

The operation device 10a directly or indirectly receives a motion of an operator who is a user and provides a motion signal indicating the received motion to the robot 20. The operation device 10a detects a bio-signal which is generated in the operator and generates a motion signal indicating a predicted value at a prediction time of the operator from the detected bio-signal. The operation device 10a includes a detection unit 110, a prediction unit 120, and a display unit 140.

The operation device 10a may be configured as a so-called wearable device comprising a mounting fixture, which can be mounted on a human body. Members constituting the functional units are provided in the mounting fixture. For example, the operation device 10a comprises a glove and a head band as at least a part of the mounting fixture. A glove can be mounted on a hand which is a part of a human body. The glove is provided with the detection unit 110 and is configured as a data glove. The number of data gloves may be one or two. The individual data gloves are used to operate manipulators constituting the robot 20. The number of data gloves may be equal to the number of manipulators. The head band can be mounted on a head which is a part of a human body. The head band is provided with the display unit 140 and may be configured as a head-mounted display (HMD).

The detection unit 110 comprises a bio-signal detecting unit that detects a bio-signal which is generated in an operator. The detection unit 110 outputs the detected bio-signal to the prediction unit 120. The detection unit 110 acquires, for example, an electromyogram (EMG) signal as the bio-signal. The electromyogram signal indicates change of a myopotential with time in a region of the human body (e.g. an upper arm and a hand), that is, a myopotential for each time. An electromyogram may be a type of an electromyogram signal. In this embodiment, the detection unit 110 comprises a surface electrode. By means of the surface electrode mounted on a body surface, an electromyogram signal can be noninvasively acquired. The detection unit 110 may perform a predetermined pre-process on the detected myopotential and output an electromyogram signal indicating the processed myopotential to the prediction unit 120.

The prediction unit 120 predicts a motion of an operator at a prediction time at which a predetermined prediction latency has elapsed from the current time as a predicted value using a prescribed machine learning model on the basis of the bio-signal input from the detection unit 110. The motion is represented in a time series of posture at each time. The prediction unit 120 transmits a motion signal indicating the predicted value to the robot 20. For example, a joint motion may be used as the operator motion. The joint motion is expressed by an angle for each pair in a human body at each time on the basis of a muscle dynamics model, the angle formed by mutually connected two regions that comprise the pair. The muscle dynamics model is a type of human body model indicating a posture or a motion of the human body. The plurality of regions include wrists, palms, and finger joints. A finger joint is a region which is a part of a finger with one or both ends connected to other regions. The motion of the operator may represent a position of a certain portion (for example, a wrist) in which an individual data glove is mounted or the center of gravity between portions as a representative position instead of the joint motion or in addition to the joint motion. The machine learning model may be any type of mathematical model, which can be designed to estimate a motion based on a bio-signal, such as a neural network, a random forest, etc.

Figure 2:
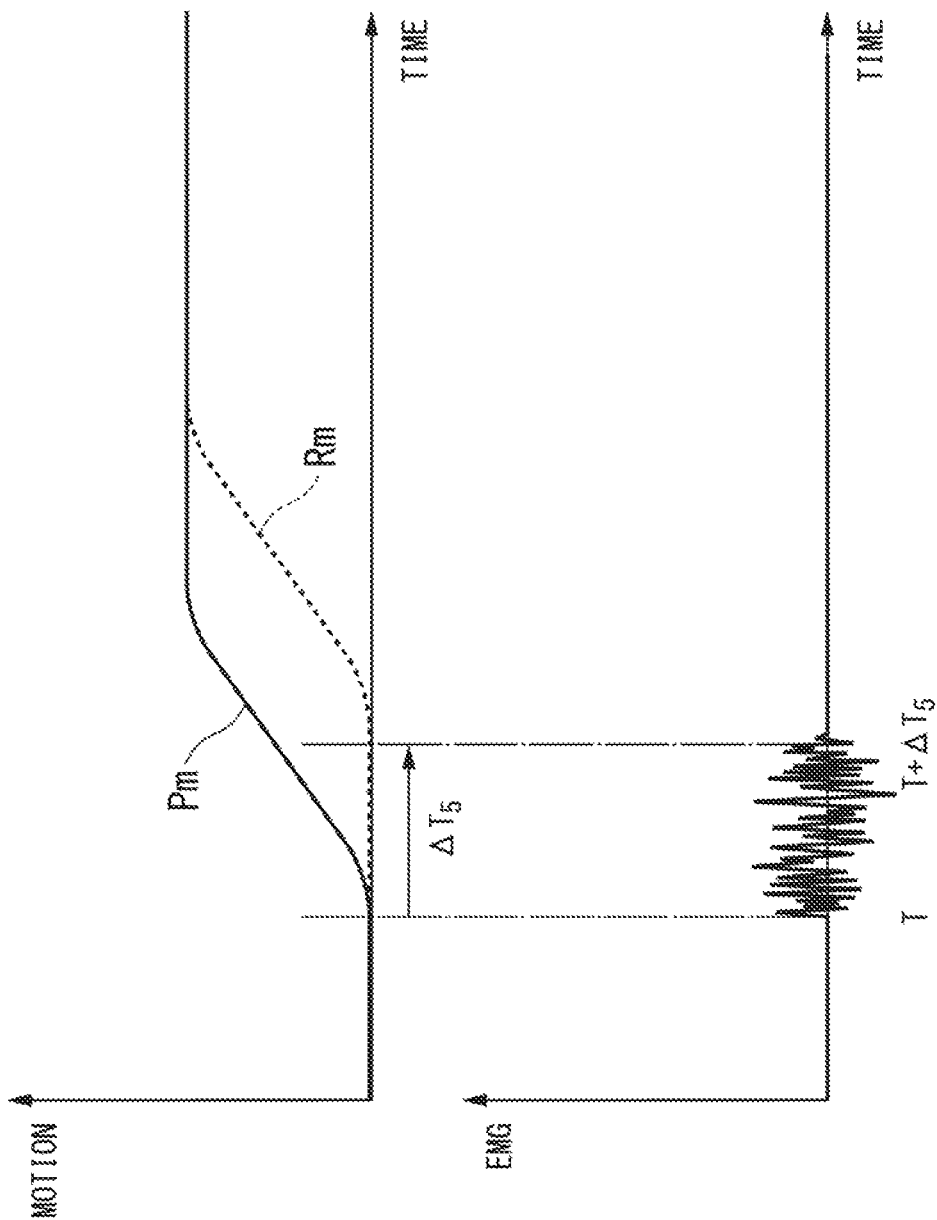
FIG. 2 is a diagram illustrating an example of an EMG and a motion of an operator.

In general, a predetermined delay occurs from generation (ignition) of a myopotential until a motion is performed with exertion of muscle tension. This delay is referred to as an electromechanical delay (EMD). In this specification, the delay may also be referred to as delay $\Delta T_5$. In the example illustrated in FIG. 2, regarding the EMG, generation of a myopotential is started at time T, and a motion is started at time $T+\Delta T_5$ at which the delay $\Delta T_5$ has elapsed thereafter (Curve Rm). As will be described later, a motion (a curve Pm) can be predicted before an actual motion is performed by analyzing a bio-signal. The delay $\Delta T_5$ typically ranges approximately 100 ms to 300 ms.

The display unit 140 receives image data from the imaging unit 30. The display unit 140 comprises a display that displays an image based on the received image data. An operator can recognize a motion situation of the robot 20 by viewing the image displayed on the display unit 140.

The robot 20 moves on the basis of a motion signal which is provided from the operation device 10a. The robot 20 comprises a plurality of members and an actuator that can change an angle between two neighboring members (which may be referred to as a "member pair" in this specification), changing the position and the posture of the robot 20 as a whole. The actuator is provided for each joint connecting two members. The robot 20 reproduces a motion corresponding to the operator's motion indicated by the provided motion signal. The robot 20 may be a single-arm robot having one manipulator or may be a two-arm robot having two manipulators. Each manipulator comprises one robot arm and one end effector. The end effector may also be referred to as a robot hand. For example, it is assumed that the robot 20 is a two-arm robot and the operator stretches the right arm forward. In this case, the robot 20 operates the robot arm such that the end effector corresponding to the right hand of the operator moves forward. When the operator closes the left hand, the robot 20 deforms a plurality of fingers constituting the end effector corresponding to the left hand of the operator, such that tips thereof come together.

The robot 20 comprises a control unit 210 and a driving unit 220.

The control unit 210 controls the motion of the robot 20 on the basis of the motion signal provided from the operation device 10a. For example, the control unit 210 controls positions and postures of the members constituting the robot 20 such that the end effectors move according to the motion indicated by the motion signal. More specifically, the control unit 210 converts the positions of the end effectors to positions in a robot coordinate system corresponding to a representative position of the operator indicated by the motion signal and sets the converted positions as target values of the positions of the end effectors. The control unit 210 may set positions in the robot coordinate system corresponding to positions of the individual regions indicated by joint motions as target values of the positions of the members corresponding to the respective regions. The control unit 210 determines an angle formed for each member pair in a period in which the end effectors or the members thereof reach target positions as target values by solving a publicly known inverse kinematic problem. The control unit 210 outputs a control signal indicating the determined target values to the driving unit 220.

The driving unit 220 comprises an actuator and a controller for each member pair. The controller drives the actuator such that a current value of the angle formed by each member pair at that time reaches a target value of the angle indicated by the control signal. The controller can employ any method as long as it is a method of decreasing a difference between the current value and the target value. The controller may be, for example, one of a PID controller and a PD controller.

The control unit 210 may set a torque as the target value for each member pair. In this case, the controller of the driving unit 220 drives the actuator such that the current value of the torque applied to the corresponding member pair at that time reaches the target value of the angle indicated by the control signal.

In the example illustrated in FIG. 1, the following factors may be delay components, which occur until an operator motion is reflected on an image of the motion of the robot 20 displayed on the display unit 140. (1) Communication delay $\Delta T_1$: The communication delay $\Delta T_1$ is a period in which a motion signal indicating a motion of an operator is transmitted from the prediction unit 120 to the control unit 210. In the related art, the detection unit 110 acquires the motion signal indicating the motion of the operator and provides the acquired motion signal to the robot 20.

Figure 7:
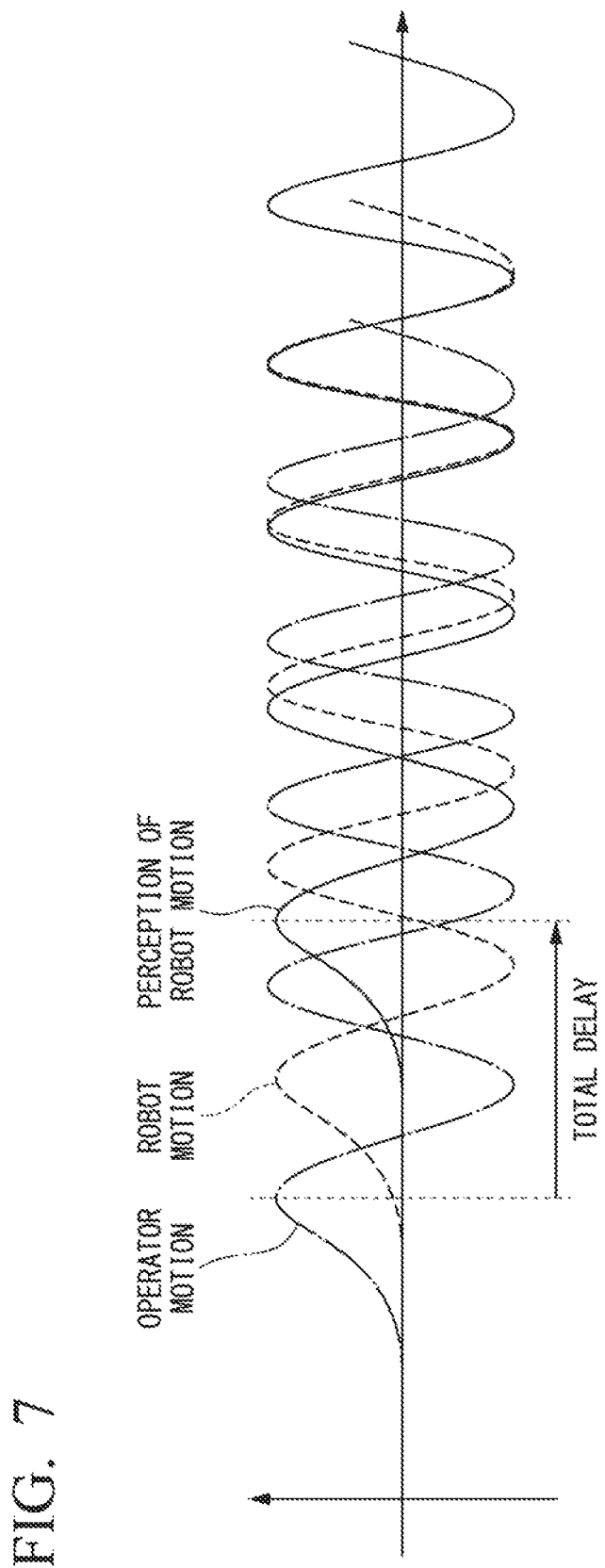
FIG. 7 is a diagram illustrating an example of perception of a bio-signal, an operator motion, and a robot motion.

(2) Control delay $\Delta T_2$: The control delay $\Delta T$ is a period in which an acquired motion signal is reflected in the motion of the robot 20. In the example illustrated in FIG. 7, a period from an operator motion to a robot motion corresponds to the sum of the communication delay $\Delta T_1$ and the control delay $\Delta T_2$.

(3) Monitoring delay $\Delta T_3$: The monitoring delay $\Delta T_3$ is a period in which an image indicating a motion of the robot 20 is captured by the imaging unit 30 and image data indicating the captured image is generated.

(4) Transmission delay $\Delta T_4$: The transmission delay $\Delta T_4$ is a period in which image data is transmitted from the imaging unit 30 to the display unit 140. In the example illustrated in FIG. 7, a period from a robot motion to recognition of the robot motion corresponds to the sum of the monitoring delay $\Delta T_3$ and the transmission delay $\Delta T_4$. Accordingly, when the operation device 10a acquires a motion signal indicating an operator's motion as in the related art, a total delay $\Sigma T$ is the sum $\Delta T_1+\Delta T_2+\Delta T_3+\Delta T_4$.

Figure 8:
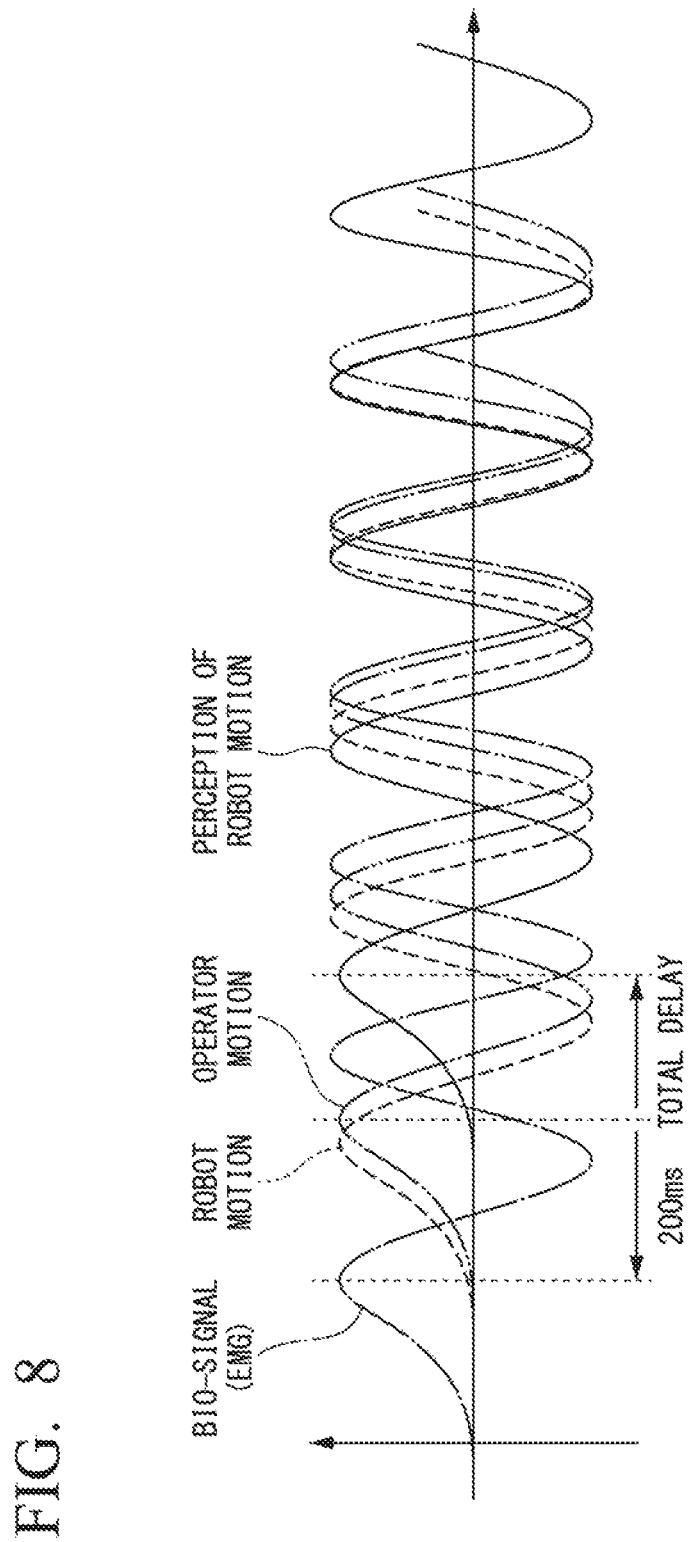
FIG. 8 is a diagram illustrating another example of perception of a bio-signal, an operator motion, and a robot motion.

In this embodiment, the prediction unit 120 predicts a motion after delay $\Delta T_5$ has elapsed from that time using a bio-signal detected by the detection unit 110 and provides a motion signal indicating the predicted motion to the robot 20. Accordingly, the operation until an operation is reflected in the robot motion and is recognized by an operator is cancelled out by the delay $\Delta T_5$. In the example illustrated in FIG. 8, a period from an operator motion which is predicted based on the EMG as the bio-signal to the robot motion corresponds to $\Delta T_1+\Delta T_2-\Delta T_5$ obtained by subtracting the delay $\Delta T_5$ from the sum of the communication delay $\Delta T_1$ and the control delay $\Delta T_2$. The delay $\Delta T_5$ corresponds to the EMD and is, for example, 200 ms. Accordingly, the total delay $\Sigma T$ is decreased to $\Delta T_1+\Delta T_2+\Delta T_3+\Delta T_4-\Delta T_5$ obtained by subtracting the delay $\Delta T_5$ from the total delay in the related art. Accordingly, it is possible to improve operability for the operator and to enhance an operational feeling on the robot 20.

Second Embodiment

A second embodiment will be described with a focus mainly on differences from the first embodiment. Unless otherwise mentioned, processings and configurations common to the first embodiment will be referred to the corresponding descriptions with the same reference signs.

Figure 3:
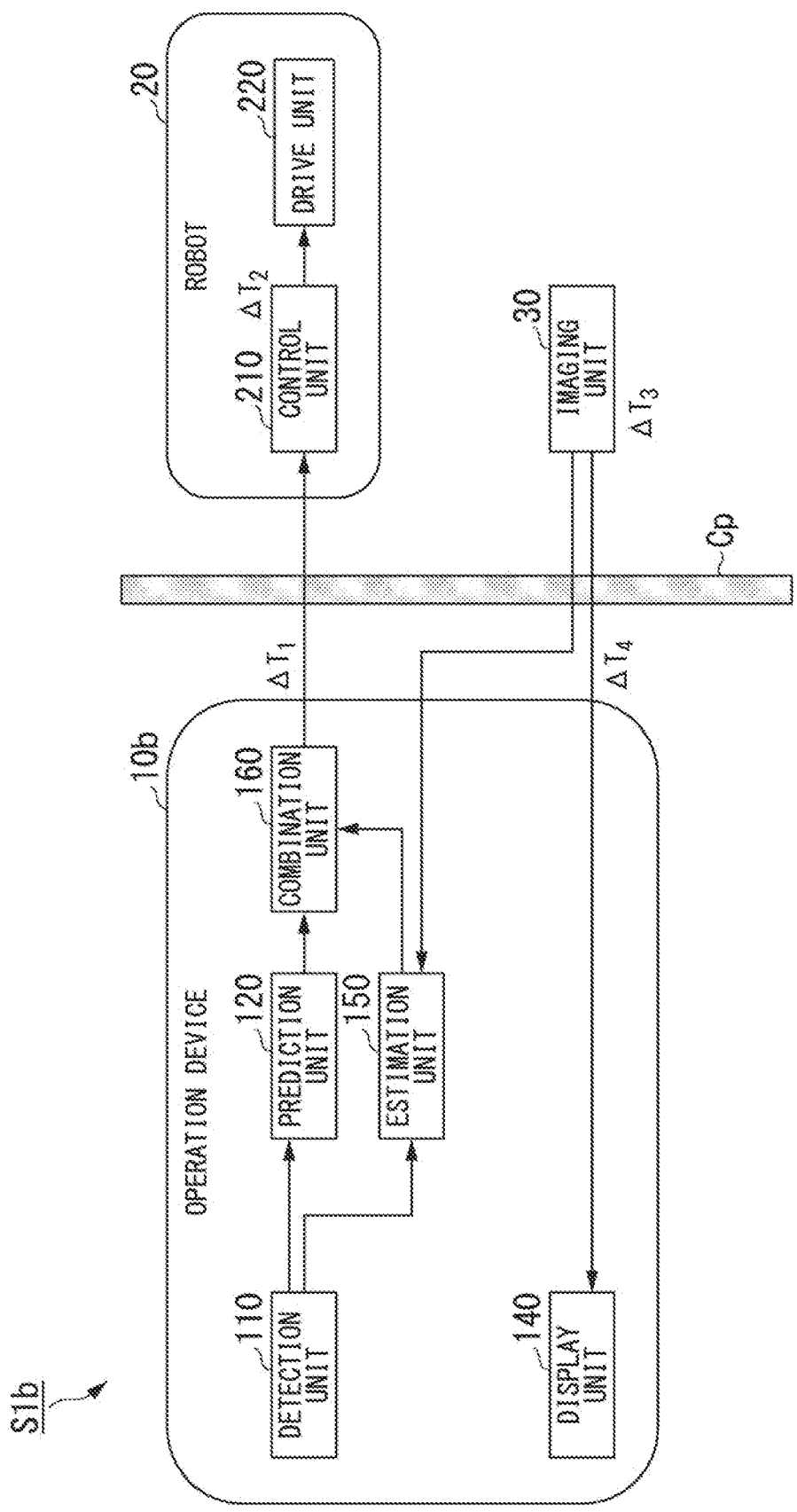
FIG. 3 is a block diagram schematically illustrating an example of a configuration of an operation system according to a second embodiment.

FIG. 3 is a block diagram schematically illustrating an example of a configuration of an operation system S1b according to this embodiment.

The operation system S1b comprises an operation device 10b, a robot 20, and an imaging unit 30. The operation device 10b comprises a detection unit 110, a prediction unit 120, a display unit 140, an estimation unit 150, and a combination unit 160.

The detection unit 110 comprises a motion detecting unit that detects a motion of the operator in addition to the bio-signal. The detection unit 110 outputs a motion signal indicating the detected motion to the estimation unit 150. The detection unit 110 comprises, for example, acceleration sensors that detect positions of respective operator regions. The regions may include at least a palm and joints of fingers. The regions may further include a wrist. The individual acceleration sensors may be mounted on the data glove. The individual acceleration sensors can be installed at positions which come into contact with parts of which acceleration is to be detected when the data glove is worn on an operator hand.

The detection unit 110 may comprise an imaging unit that captures an image of an operator body and a motion detecting unit that optically detects positions of operator regions using the captured image (motion capture) instead of the acceleration sensors. Markers that reflect light of a predetermined wavelength component are attached to predetermined operator regions.

The detection unit 110 may detect a gaze direction of the operator. The detection unit 110 outputs gaze information indicating the detected gaze direction to the prediction unit 120. The detection unit 110 comprise, for example, an eye tracker that detects a gaze direction of an operator. The eye tracker may be mounted, for example, in a head-mounted display. The eye tracker can be mounted on a position at which an image of the pupils of eyes can be acquired to detect a gaze, when the head-mounted display is worn on the operator head.

The detection unit 110 may further comprise an acceleration sensor that detects a direction and a position of the operator head. The detection unit 110 outputs operator position information indicating the detected direction and the detected position to the prediction unit 120. The detection unit 110 comprise, for example, a six-axis acceleration sensor that detects a direction and a position of the head of the operator. The six-axis acceleration sensor detects accelerations in three directions perpendicular to each other in a three-dimensional space and axial accelerations in the three directions. The detection unit 110 can determine the directions by performing second-order integration of the detected axial accelerations in three directions. The detection unit 110 can determine the positions by performing second-order integration of the detected accelerations in three directions. The acceleration sensor can be installed at positions, where the measurement target (e.g. forehead) of the accelerations and the axial accelerations are contacted, when the head-mounted display is worn on the operator head.

A motion signal from the detection unit 110 is input to the estimation unit 150 and image data from the imaging unit 30 is input thereto. The estimation unit 150 estimates a second motion which can be performed by the operator on the basis of the motion signal and the image data. The second motion is mainly a local motion which is finer than a macroscopic motion (for example, movement of the hand) estimated by the prediction unit 120. Examples of the second motion comprise motions of individual fingers and fine adjustment of one or both of the position and the direction of the hand. The estimation unit 150 outputs a second motion signal indicating the estimated second motion to the combination unit 160.

The estimation unit 150 estimates a motion of bringing the tips of the fingers together as the second motion, for example, when image data indicating a situation in which the end effector of the robot 20 enters an area closer to an object by the size and a motion signal indicating start of motions of the plurality of fingers are input. In this situation, there is a high likelihood that the end effector will be caused to grasp the object by the operator closing the hand. The estimation unit 150 estimates a motion of moving the tips of the fingers away from each other as the second motion, for example, when image data indicating a situation in which the end effector of the robot 20 grasps an object placed on a table and a motion signal indicating start of motions of the plurality of fingers are input. In this situation, it is highly likely that the end effector will be caused to release the grasped object by the operator opening the fingers.

The estimation unit 150 may determine the second motion additionally using gaze information which is input from the detection unit 110. The estimation unit 150 estimates the gaze direction indicated by the gaze information as a direction of interest. The direction of interest means a direction in which the operator is interested. The estimation unit 150 can convert the gaze direction indicated by the gaze information to a direction in a robot environment coordinate system based on the position and the direction of the imaging unit 30 on the basis of operator position information input from the detection unit 110 and the position, the direction, and the field of view of the imaging unit 30, and determine the converted direction as the direction of interest. When a plurality of objects are represented on the image indicated by the image data, the estimation unit 150 can determine a specific object, which an image appears in the direction of interest out of the plurality of objects, as an object of interest. The estimation unit 150 may determine a second motion on the basis of the motion signal, the image data, and the object of interest and ignore objects other than the object of interest. Accordingly, it is possible to avoid unnecessary estimation of the second motion for an object which is not intended by an operator other than the object of interest.

In the estimation unit 150, for example, second motion data indicating a relationship between image data and a motion signal which are input information and a second motion which is output information is set in advance. The estimation unit 150 can determine the second motion corresponding to the input information thereof with reference to the second motion data. In the estimation unit 150, a parameter set for estimating a second motion which is output information from the image data and the motion signal which are input information may be set in advance using a second machine learning model. The estimation unit 150 can determine the second motion on the basis of the input information using the second machine learning model under the set parameter set. The input information may further comprise gaze information.

The prediction unit 120 outputs a motion signal indicating a predicted value predicted by itself to the combination unit 160 instead of the robot 20.

A motion signal from the prediction unit 120 is input to the combination unit 160 and a second motion signal from the estimation unit 150 is input thereto. The combination unit 160 combines a first motion which is a motion indicated by the motion signal and a second motion which is indicated by the second motion signal and constructs a combined motion. As long as the first motion and the second motion are consistent each other with no conflict, the combined motion is expressed as a joint motion. The combination unit 160 outputs a motion signal indicating the constructed combined motion to the robot 20.

When the first motion and the second motion cause a conflict or when an adverse impact is predicted by performing the first motion and the second motion, the combination unit 160 selects one motion thereof and dismisses the other motion thereof. For example, when a motion of an operator hand indicated by the first motion corresponds to a motion for an object in a direction in which the end effector grasping the object is separated from the table and the second motion is a motion of causing the tips of the fingers to withdraw from each other (corresponding to release of the state in which the object is grasped), the combination unit 160 may select the first motion and dismiss the second motion. In this case, when the end effector is separated from the table while grasping the object, the object can be prevented from dropping due to the second motion. When the first motion indicates an initiation of a motion of a static hand (corresponding to start of the end effector) and the second motion indicates a continual motion, causing the tips of the fingers to come together (corresponding to the course of grasping an object), the combination unit 160 may dismiss the first motion and select the second motion. In this case, the robot can be prevented from moving in a state in which grasping of the object by the end effector has not been completed.

In the combination unit 160, for example, a first motion, a second motion, and selection data indicating whether to select the first motion and the second motion may be set in advance. The combination unit 160 identifies whether to perform the first motion and the second motion with reference to the selection data. When it is identified that the first motion and the second motion have to be performed, the combination unit 160 generates a motion signal indicating a combination motion by combining the first motion and the second motion and outputs the generated motion signal to the robot 20. When it is identified that one of the first motion and the second motion has to be performed and the other thereof does not have to be performed, the combination unit 160 generates a motion signal indicating one motion and outputs the generated motion signal to the robot 20. When it is identified that none of the first motion and the second motion has to be performed, the combination unit 160 does not generate a motion signal indicating a motion.

The control unit 210 of the robot 20 controls the motion of the robot 20 on the basis of a motion signal which is provided from the operation device 10b. A motion signal indicating a combined motion may be input to the control unit 210. In this case, a motion in which a motion estimated on the basis of a bio-signal and a second motion estimated on the basis of a motion environment are combined is instructed to the control unit 210 and this motion is instructed to the driving unit 220. For example, a global motion is instructed as the estimated motion and a local motion is instructed as the second motion. For example, the global motion is a translational motion of a wrist of which a moving speed is relatively high. The second motion comprise positioning of individual fingers with respect to an object, grasping of the object, and release of the grasped state. Accordingly, an operator can instruct local motions more suitable for the operator's intention in the motion environment of the robot 20.

Model Training

Figure 4:
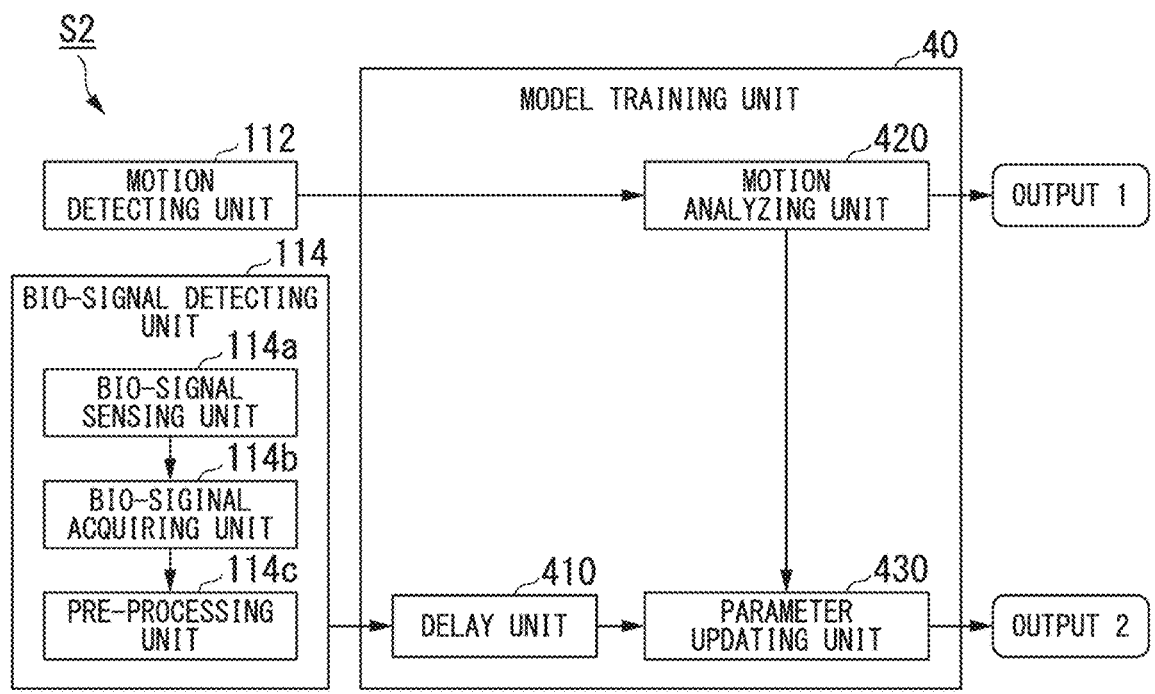
FIG. 4 is a block diagram schematically illustrating an example of a configuration of a model training system.

Training of a machine learning model will be described below. FIG. 4 is a block diagram schematically illustrating an example of a configuration of a model training system S2.

The model training system S2 is a system that trains a machine learning model which is used by the prediction unit 120.

The model training system S2 comprises a motion detecting unit 112, a bio-signal detecting unit 114, and a model training unit 40. The motion detecting unit 112 detects a motion of a human body. The bio-signal detecting unit 114 detects a bio-signal which is generated in the human body. The motion detection target may be a body of a person other than an operator and is preferably a body of the operator. The model training unit 40 determines a parameter set of a machine learning model such that a difference between an estimated motion (output 2) and the detected motion (output 1) decreases minimization). Output 2 is estimated by using the machine learning model on the basis of the detected bin-signal and the detected motion (output 1). With this configuration, the model training unit 40 may train the machine learning model using training data (supervised data) including a plurality of data pairs including an existing bio-signal and a motion signal (supervised training).

The motion detecting unit 112 detects a motion of a human body similarly to the detection unit 110. The motion detecting unit 112 comprises an imaging unit that captures an image indicating a body of an operator and a motion analyzing unit that optically detects a position of each portion of the operator using the image captured by the imaging unit. The motion detecting unit 112 outputs a motion signal indicating the detected motion of a human body to the model training unit 40.

The bio-signal detecting unit 114 detects a bio-signal that is generated in the human body similarly to the detection unit 110. The bio-signal detecting unit 114 comprises, for example, a bio-signal sensing unit 114a, a bio-signal acquiring unit 114b, and a pre-processing unit 114c.

The bio-signal sensing unit 114a is mounted on or in a vicinity of a predetermined region of a human body and senses a bio-signal generated in the region. The bio-signal sensing unit 114a may be the surface electrode, for example.

The bio-signal acquiring unit 114b acquires the bio-signal sensed by the bio-signal sensing unit 114a. The bio-signal acquiring unit 114b outputs the acquired bio-signal to the pre-processing unit 114c. The bio-signal acquiring unit 114b is, for example, an EMU capture. For example, the EMG capture amplifies a potential which is generated in the bio-signal sensing unit 114a and acquires a bio-signal indicating the amplified potential.

The pre-processing unit 114c performs a pre-processing on the bio-signal input from the bio-signal acquiring unit 114b and outputs the processed bio-signal acquired through the pre-processing to the model training unit 40. The pre-processing comprises, for example, one or both of rectification and filtering. Rectification is a process of setting a potential at each time as a potential of the processed bio-signal when the potential at each time is equal to or higher than a predetermined potential threshold value (for example, 0 V), and setting the predetermined potential threshold value as the potential of the processed bio-signal when the potential at each time is lower than the predetermined potential threshold value. Filtering is a process of maintaining a component of a predetermined significant frequency band as the bio-signal and curbing or removing components of the other frequency bands. Accordingly, it is possible to remove noise which is mixed into the bio-signal.

The model training unit 40 comprises a delay unit 410, a motion analyzing unit 420, and a parameter updating unit 430.

The delay unit 410 delays the bio-signal which is input from the bio-signal detecting unit 114 by a delay (for example, 200 ms) corresponding to a predetermined prediction latency. The delay unit 410 outputs the delayed bio-signal to the parameter updating unit 430.

The motion analyzing unit 420 analyzes a motion indicated by the motion signal input from the motion detecting unit 112 using a publicly known muscle dynamics model and outputs a motion signal indicating the analyzed motion to the parameter updating unit 430. For example, the motion analyzing unit 420 identifies respective positions of plural regions in a human body based on the input motion signal and determines an angle formed by two regions for each pair comprising the two portions connected to each other. The motion analyzing unit 420 can generate a motion signal indicating the determined angle.

The parameter updating unit 430 regressively updates the parameter set of the machine learning model such that a difference between the estimated value of the human motion and a measured value of the human motion is minimized. The estimated value is calculated as output information by using a prescribed machine learning model and the bio-signal input from the delay unit 410 as input information. The measured value is indicated by the motion signal input from the motion analyzing unit 120. The measured value and the estimated value correspond to output 1 and output 2, respectively, in the drawing. A loss function representing a magnitude of the difference between the measured value and the estimated value may be, for example, one of a sum of squared differences (SSD) and cross entropy.

The parameter updating unit 430 may update the parameter set to be updated a preset number of times or may repeat the updating until the parameter set converges on a fixed value. The parameter updating unit 430 can determine whether the parameter set has converged, for example, on the basis of whether the magnitude of the difference between before and after some or all parameters of the parameter set are updated is equal to or less than a predetermined threshold. The parameter updating unit 430 sets the updated parameter set in the prediction unit 120. The machine learning model which is used by the parameter updating unit 430 can be the same type of mathematical model as the machine learning model which is used by the prediction unit 120.

The motion detecting unit 112 and the bio-signal detecting unit 114 may be constituted in the detection unit 110 or may be provided separately from the detection unit 110. The model training unit 40 may be provided in one or both of the operation systems S1$a$ and S1$b$ or may be implemented in a device independent from both the operation systems S1$a$ and S1$b$.

When the model training unit 40 is provided in one or both of the operation systems S1$a$ and S1$b$, model parameters of the machine learning model may be updated using the bio-signal input from the detection unit 110 and the motion signal during operation of the robot 20 (online training). Accordingly, the predicted value of the motion estimated on the basis of the bio-signal is corrected to approximate the predicted value of a current motion, thereby further improving prediction accuracy for the motion signal.

Machine Learning Model

Figure 5:
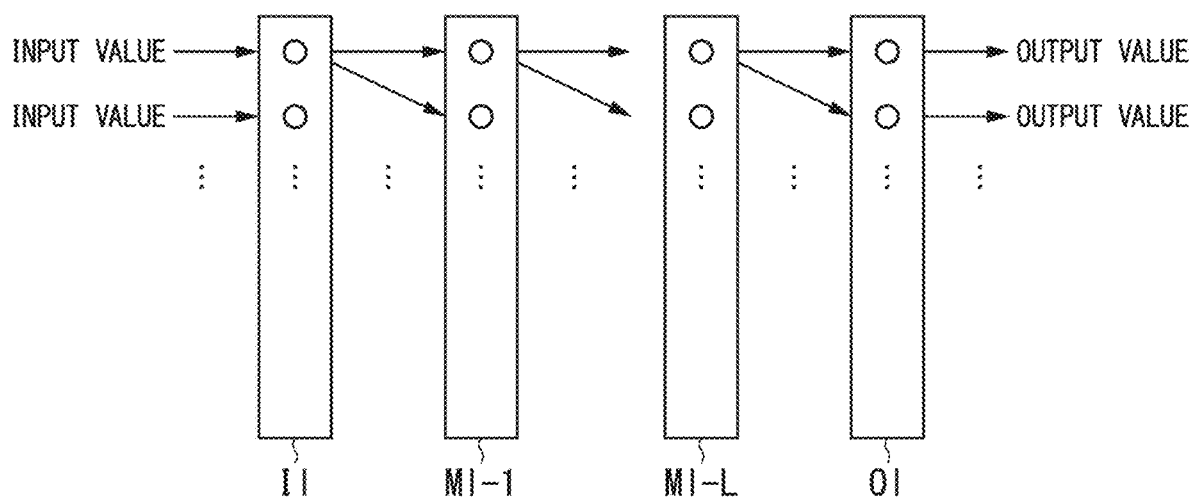
FIG. 5 is a diagram illustrating an example of a configuration of a machine learning model.

An example of a machine learning model will be described below. FIG. 5 illustrates an example of a configuration of a convolutional neural network (CNN) which is a type of neural network. The CNN is a representative example of a machine learning model which is used for so-called deep learning. The CNN comprises one input layer, a plurality of intermediate layers (hidden layers), and one output layer. The CNN illustrated in FIG. 5 comprises an input layer Il, L intermediate layers Ml-1 to Ml-L (where L is an integer equal to or greater than 2), and an output layer Ol. Each layer comprises a predetermined number of nodes. The plurality of intermediate layers comprise at least one convolution layer and one pooling layer.

Each node of the input layer Il outputs an input value input thereto to at least one node of a subsequent layer. For example, in the prediction unit 120 and the parameter updating unit 430, individual sample values in a predetermined period constituting the bio-signal (for example, 10 ms to 100 ms) are input to the nodes corresponding to the sample values.

Each node of the output layer Ol outputs an input value input from at least one node of a previous layer to the outside. In the prediction unit 120 and the parameter updating unit 430, individual elements values (for example, angles between portions) indicating a motion are output from the nodes corresponding to the element values.

The number of kernels is set in advance in the convolution layer. The number of kernels corresponds to the number of kernels which are used for processing (for example, arithmetic operation) of each input value. The number of kernels is generally less than the number of input values. A kernel represents a process unit for calculating one output value once. An output value which is calculated in a certain layer is used as an input value to a subsequent layer. A kernel may be also referred to as a filter. A kernel size represents the number of input values which are used for one processing in one kernel. A kernel size is generally an integer equal to or greater than 2.

The convolution layer is a layer that calculates a convolved value by performing a convolutional operation for each kernel on an input value input from a previous layer of each of a plurality of nodes and calculates a corrected value by adding a bias value to the calculated convolved value. The convolution layer calculates a function value of a predetermined activation function for the calculated corrected value and outputs the calculated output value to a subsequent layer. One or more input values are input to each node of the convolution layer from a previous layer and a convolution coefficient which is independent from the input values is used to calculate the convolved value at each node. The parameters such as the convolution coefficient, the bias value, and the activation function are a part of a set of model parameters.

For example, a rectified linear unit or a sigmoid function can be used as the activation function. The rectified linear unit is a function of determining a predetermined threshold value (for example, 0) as an output value for an input value which is equal to or less than the predetermined threshold value and outputting an input value which is greater than the predetermined threshold value without any change. Accordingly, the predetermined threshold value can be a part of the set of model parameters. Regarding the convolution layer, whether to refer to input values from nodes of a previous layer and whether to output an output value to nodes of a subsequent layer can also be a part of the set of model parameters.

The pooling layer is a layer including a node that determines one representative value from the input values which are input from a plurality of nodes of a previous layer and outputs the determined representative value as an output value to a subsequent layer. For example, a value that is statistically representative of a plurality of input values such as a maximum value, an average value, or the mode is used as the representative value. A stride is set in advance in the pooling layer. A stride represents a range of nodes adjacent to each other in a layer immediately before an input value to one node is referred to. Accordingly, the pooling layer may be a layer that down-samples the input value from a previous layer and outputs the output value to a subsequent layer.

Figure 9:
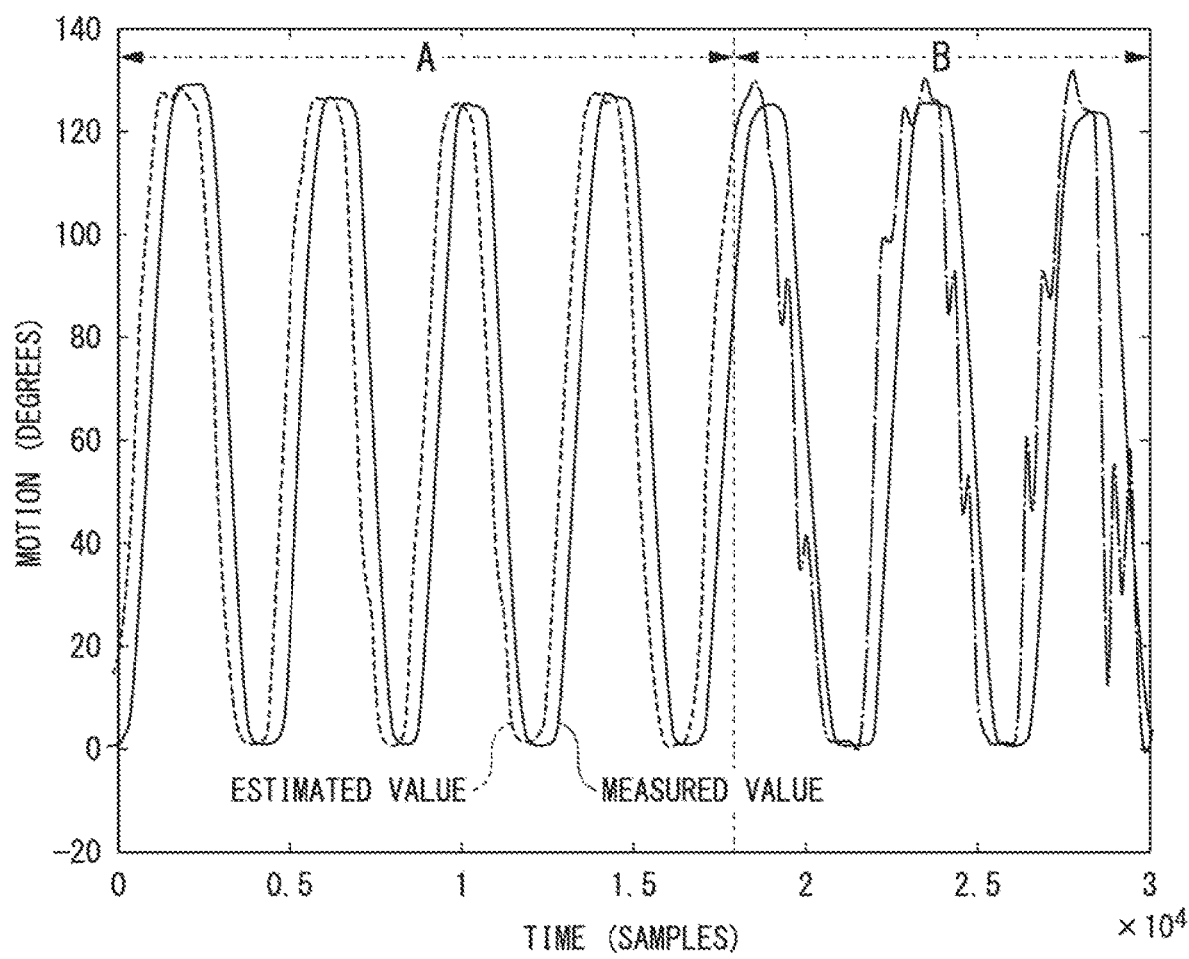
FIG. 9 is a diagram illustrating an example of estimation of an operator motion.

An example of an operator motion estimated by using a machine learning model is described below. FIG. 9 is a diagram illustrating an example in which an operator's motion is estimated. The vertical axis and the horizontal axis in FIG. 9 represent a motion and time, respectively. A section A represents an estimated value of a motion, estimated by using a machine learning model based on a bio-signal used for model training, and a measured value of the motion. The estimated value is almost equal to the measured value. The estimated value advances the measured value by a period corresponding to a prediction latency. This means that the motion at a time at which the prediction latency has elapsed from the current time is predicted. This is also due to synchronization with the motion, which serves as output information, by introducing a delay corresponding to the prediction latency to the bio-signal, which is input information to the machine learning model in model training. A section B represents an estimated value, estimated using a machine learning model based on a bio-signal not used for model training, and a measured value of the motion. An error s appeared on the estimated value, which has, however, a tendency of temporal change similar to that of the measured value. The estimated value advances the measured value by the period corresponding to the prediction latency, whereas the periodicity and amplitude thereof are almost the same as those of the measured value.

In the aforementioned description, an EMG is used as a bio-signal, but not limited thereto. The bio-signal with a correlation with a motion of a human body and generated prior to the motion, may be applicable. For example, an electroencephalogram (EEG) can be used as such a bio-signal. In this case, the detection unit 110 may be configured as a brain-machine interface (BMI) that noninvasively detects an electroencephalogram. The BMI comprises a scalp electrode for detecting potential variation caused by activity of the brain. The scalp electrode may be mounted on a head-mounted display. The scalp electrode can be mounted at a position which contacts the operator's scalp when the operator wears the head-mounted display.

As described above, the operation systems S1a and S1b according to the aforementioned embodiments may comprise the prediction unit 120 configured to determine a predicted value of an operator motion after a predetermined prediction latency from the current time based on a bio-signal using a prescribed machine learning model, the bio-signal captured from the operator, and the control unit 210 configured to control a motion of a robot 20 based on the predicted value.

With this configuration, the motion of the robot 20 is controlled based on the bio-signal generated prior to the operator motion. Since a delay, until the operator motion is recognized to be reflected in the motion of the robot 20 is reduced, thereby improving the operability of the robot 20. In addition, it is possible to improve the operational feeling to the operator in control of the robot.

The operation system S1b may further comprise the estimation unit 150 configured to estimate a second motion based on at least an image representing a motion environment of the robot 20 and a motion signal indicating the operator motion, the second motion potentially performed by the operator, and the control unit 210 may control the motion of the robot 20 additionally based on the second motion.

With this configuration, a motion intended by the operator is estimated as the second motion based on the operator motion and the motion environment of the robot 20. Since the operation of the robot 20 is supplemented with the second motion, the operator's intention is reflected in the motion of the robot 20, thereby further improving the operability of the robot 20.

The operation systems S1a and S1b may further comprise the detection unit 110 configured to detect an electromyogram as the bio-signal.

With this configuration, the electromyogram generated prior to the motion can be acquired and used to predict the motion without the operator's awareness.

The operation systems S1a and S1b may further comprise the detection unit 110 configured to detect an electroencephalogram as the bio-signal.

With this configuration, the electroencephalogram generated prior to the motion can be acquired and used to predict the motion without the operator's awareness.

The operation systems S1a and S1b may further comprise the transmission path $C_p$ the predicted value.

With this configuration, even in a usage form with the operation devices 10a and 10b separated from the robot 20, thereby controlling the motion of the robot 20.

The operation systems S1a and S1b may further comprise the imaging unit 30 configured to capture an image representing a motion environment of the robot 20 and a display unit 140 configured to display the image.

With this configuration, the image representing the motion environment of the robot 20 captured by the imaging unit 30 is displayed on the display unit 140. Accordingly, even in a usage form with the operator separated from the robot 20, the operator can visually recognize a situation of the robot 20.

The operation systems S1a and S1b may further comprise a model training unit 40 configured to determine parameters of the machine learning model such that a difference between the predicted value of the operator's motion determined based on the bio-signal and a measured value of the operator motion at the current time minimizes, the bio-signal delayed by the prediction latency.

With this configuration, it enables to train the machine learning model for estimating the motion based on the operator motion and the bio-signal generated prior to the motion.

While embodiments of the invention have been described above with reference to the drawings, a specific configuration is not limited to the aforementioned description, and can be subjected to various modifications in design without departing from the gist of the invention.

For example, in the operation systems S1a and S1b, one or both of the imaging unit 30 and the display unit 140 may be omitted. The transmission path $C_p$ may not comprise a communication network. This configuration can also be employed as long as an operator can be located relatively close to the robot 20 and view the motion environment of the robot 20.

The operation device 10a may comprise the control unit 210 and the control unit 210 may be omitted from the robot 20.

As long as the prediction unit 120 is connected to the detection unit 110 by wire or wireless such that various types of data can be transmitted, the detection unit 110 may be omitted from the operation devices 10a and 10b.

The operation devices 10a and 10b may comprise the model training unit 40.

The operation devices 10a and 10b may not be configured to be mounted on a human body. The operation devices 10a and 10b may be, for example, of a stationary type.

Figure 6:
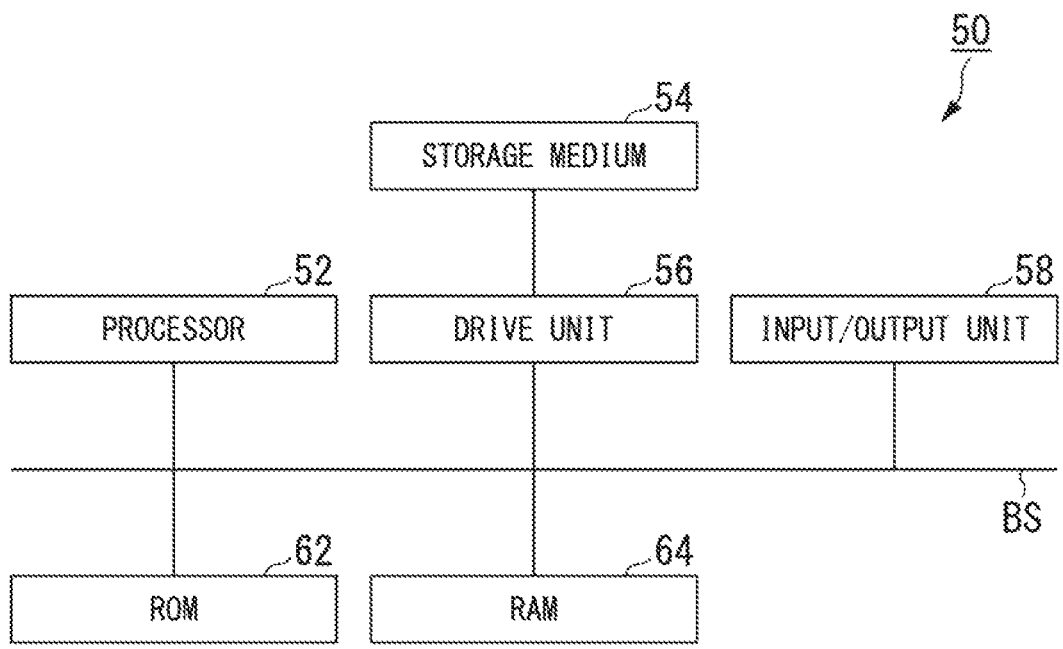
FIG. 6 is a diagram illustrating an example of a hardware configuration.

The aforementioned devices (for example, the operation devices 10a and 10b, the robot 20, and the model training device) may be implemented by means of a hardware including dedicated members or may be configured as one or more computers including general-purpose members. A computer 50 illustrated in FIG. 6 comprises a processor 52, a driving unit 56, an input/output unit 58, a read only memory (ROM) 62, and a random access memory (RAM) 64.

The processor 52 controls the processes for realizing the functions of the individual units or the functions of the constituents of the units. The processor 52 is, for example, a central processing unit (CPU).

The driving unit 56 may have a storage medium 54 fixed thereto or detachable therefrom. The driving unit 56 reads various types of data stored in the storage medium 54 or stores various types of data in the storage medium 54. The driving unit 56 is, for example, a semiconductor drive (SSD: Solid State Drive) or a hard disk drive (HDD). The storage medium 54 is, for example, a nonvolatile memory such as a flash memory or a hard disk.

The input/output unit 58 inputs or outputs various types of data to and from another device by wire or wireless. The input/output unit 58 may be connected to another device via a communication network such that various types of data are input or output. The input/output unit 58 may be, for example, one of an input/output interface and a communication interface or one combination thereof.

The ROM 62 is a storage medium that permanently stores programs in which commands for instructing various processes which are performed by the constituents of the individual units are described, various types of data such as parameters for executing the programs, and various types of data acquired by the constituents. In this specification, execution of processes instructed by commands described in a program may be referred to as "execute a program," "execution of a program," or the like.

The RAM 64 is a storage medium that is mainly used as a work area of the processor 52. The processor 52 records the programs and the parameters stored in the ROM 62 onto the RAM 64 with starting thereof. Then, the processor 52 temporarily records operation results acquired by the execution, the acquired data, and the like in the RAM 64.

The aforementioned devices may comprise a computer system therein. For example, the processor 52 may serve as a constituent element of a computer system. The aforementioned processes are performed by storing the processes in the form of a program in a computer-readable storage medium and causing a computer to read and execute the program. The computer system may comprise a software such as an operating system (OS), a device driver, and a utility program or hardware such as peripherals. The hardware illustrated in FIG. 6 corresponds to an example of such hardware. Examples of the "computer-readable storage medium" comprise a portable medium such as a magnetic disk, a magneto-optical disc, a ROM, a RAM or a semiconductor memory and a storage device such as a hard disk incorporated in a computer system. The computer-readable recording medium may comprise a medium that dynamically holds a program for a short time like a communication line which is used when a program is transmitted via a network such as the Internet or a communication line such as a telephone circuit or a medium that holds a program for a predetermined time such as a nonvolatile memory in a computer system serving as a server or a client in that case. The program may be a program for realizing some of the aforementioned functions or may be a so-called differential file (a differential program) which can realize the aforementioned functions in combination with another program stored in advance in the computer system.

Some or all of the aforementioned devices may be implemented as integrated circuits such as large scale integration (LSI) circuits. Functional blocks of the devices may be individually formed as processors or some or all thereof may be integrated and formed as a processor. The integration technique is not limited to an LSI and the functional blocks may be implemented as a dedicated circuit or a general-purpose processor. When an integration technique with which the LSI is replaced appears with advancement in semiconductor technology, an integrated circuit based on the technique may be used.

While preferred embodiments of the invention have been described and illustrated above, it should be understood that these are exemplary of the invention and are not to be considered as limiting. Additions, omissions, substitutions, and other modifications can be made without departing from the spirit or scope of the invention. Accordingly, the invention is not to be considered as being limited by the foregoing description, and is only limited by the scope of the appended claims.

EXPLANATION OF REFERENCES

S1a, S1b . . . Operation system
S2 Model training system
10a, 10b . . . Operation device
20 . . . Robot
30 . . . Imaging unit
40 . . . Model training unit
50 . . . Computer
52 . . . Processor
54 . . . Storage medium
56 . . . Driving unit
58 . . . Input/output unit
62 . . . ROM
64 . . . RAM
110 . . . Detection unit
112 . . . Motion detecting unit
114 . . . Bio-signal detecting unit
114a . . . Bio-signal sensing unit
114b . . . Bio-signal acquiring unit
114c . . . Pre-processing unit
120 . . . Prediction unit
140 . . . Display unit
150 . . . Estimation unit
160 . . . Combination unit
210 . . . Control unit
220 . . . Driving unit
410 . . . Delay unit
420 . . . Motion analyzing unit
430 . . . Parameter updating unit

What is claimed is:
1. An operation system comprising:
a circuitry configured to determine a predicted value of an operator motion after a predetermined prediction latency from a current time based on a bio-signal using a prescribed machine learning model, where the bio-signal is captured from the operator; and a controller configured to control a motion of a robot based on the predicted value, wherein the circuitry is configured to:

capture an image representing the robot and its surrounding, estimate a second motion of the robot based at least on the image, produce a first motion signal for the first motion and a second motion signal motion for the second motion, and determine the necessity of the first motion and the second motion with reference to selection data, the selection data indicating whether to select the first motion and the second motion, and the selection data preset in the circuitry, and control the first motion and the second motion based on the necessity, wherein the second motion includes:

a motion of which a possibility of being intended by the operator is higher than those of other motions based on the image, a motion that is more delicate than the first motion, a motion of an individual finger, and a fine adjustment of one or both of a position or a direction of a hand part.

2. The operation system according to claim 1, further comprising a signal detector configured to detect an electromyogram as the bio-signal.

3. The operation system according to claim 1, further comprising a signal detector configured to detect an electroencephalogram as the bio-signal.

4. The operation system according to claim 1, further comprising a transmission path to transmit the predicted value.

5. The operation system according to claim 4, further comprising:

a video camera configured to capture the image representing a motion environment of the robot and its surrounding; and a display device configured to display the image.

6. The operation system according to claim 1, the circuitry configured to determine parameters for the machine learning model such that a difference between the predicted value determined based on the bio-signal and a measured value of the operator motion at the current time minimizes, the bio-signal delayed by the prediction latency.

7. An operation method which is performed by an operation system, comprising:

a first step of determining a predicted value of an operator motion after a predetermined latency from a current time based on a bio-signal using a prescribed machine learning model, where the bio-signal is captured from the operator; and a second step of controlling a motion of a robot based on the predicted value;

wherein the first step includes:

capturing an image representing the robot and its surrounding, estimate a second motion of the robot based at least on the image, producing a first motion signal for the first motion and a second motion signal motion for the second motion, controlling the first motion and the second motion based on the necessity, wherein the second motion includes:

a motion of which a possibility of being intended by the operator is higher than those of other motions based on the image, a motion that is more delicate than the first motion, a motion of an individual finger, and a fine adjustment of one or both of a position or a direction of a hand part.

* * * * *